(12) United States Patent
Enbutsu

(10) Patent No.: US 8,682,941 B2
(45) Date of Patent: Mar. 25, 2014

(54) DATABASE APPARATUS

(75) Inventor: Hisayuki Enbutsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/072,007

(22) Filed: Mar. 25, 2011

(65) Prior Publication Data

US 2011/0295913 A1 Dec. 1, 2011

(30) Foreign Application Priority Data

May 28, 2010 (JP) ................................. 2010-123031

(51) Int. Cl.
*G06F 7/00* (2006.01)
*G06F 17/30* (2006.01)

(52) U.S. Cl.
USPC ............ 707/812; 707/790; 707/752; 707/736

(58) Field of Classification Search
None
See application file for complete search history.

(56) References Cited

U.S. PATENT DOCUMENTS

| | | | | |
|---|---|---|---|---|
| 5,842,196 | A * | 11/1998 | Agarwal et al. | 707/999.001 |
| 2004/0243612 | A1 | 12/2004 | Bailey | |
| 2005/0102428 | A1 * | 5/2005 | Heintze et al. | 709/245 |
| 2006/0095752 | A1 * | 5/2006 | Kao | 712/242 |
| 2009/0313252 | A1 * | 12/2009 | Gupta et al. | 707/8 |
| 2012/0317384 | A1 * | 12/2012 | Bascunana Munoz et al. | 711/162 |

FOREIGN PATENT DOCUMENTS

| | | |
|---|---|---|
| JP | 5-289913 | 11/1993 |
| JP | 2004-362575 | 12/2004 |
| JP | 2009-20793 | 1/2009 |

OTHER PUBLICATIONS

Office Action mailed Jan. 28, 2014 in corresponding Japanese Application No. 2010-123031.

* cited by examiner

*Primary Examiner* — Jau-Shya Meng
(74) *Attorney, Agent, or Firm* — Staas & Halsey LLP

(57) ABSTRACT

A logical record of a source logical page is moved to a space area or a deletion area in a destination logical page. The source logical page is sequentially set forward from the logical page immediately before the last stored logical page in a subrange. The destination logical page is sequentially set backward from the leading logical page in the subrange. When a logical record is moved, exclusive control is performed in logical page units only on the source logical page and the destination logical page. The access by online operations is not prohibited on other logical pages not exclusively controlled in the same subrange.

9 Claims, 19 Drawing Sheets

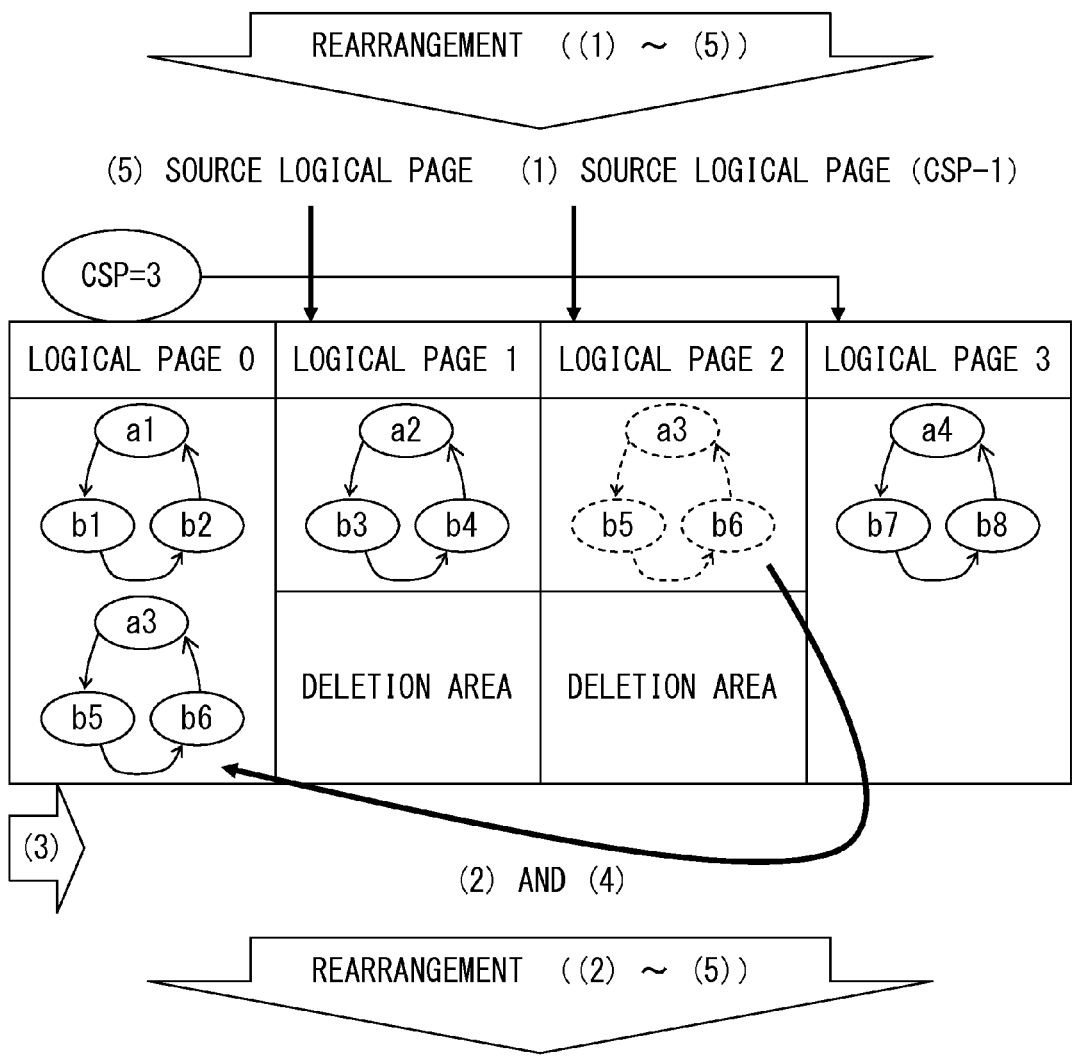
F I G. 4B

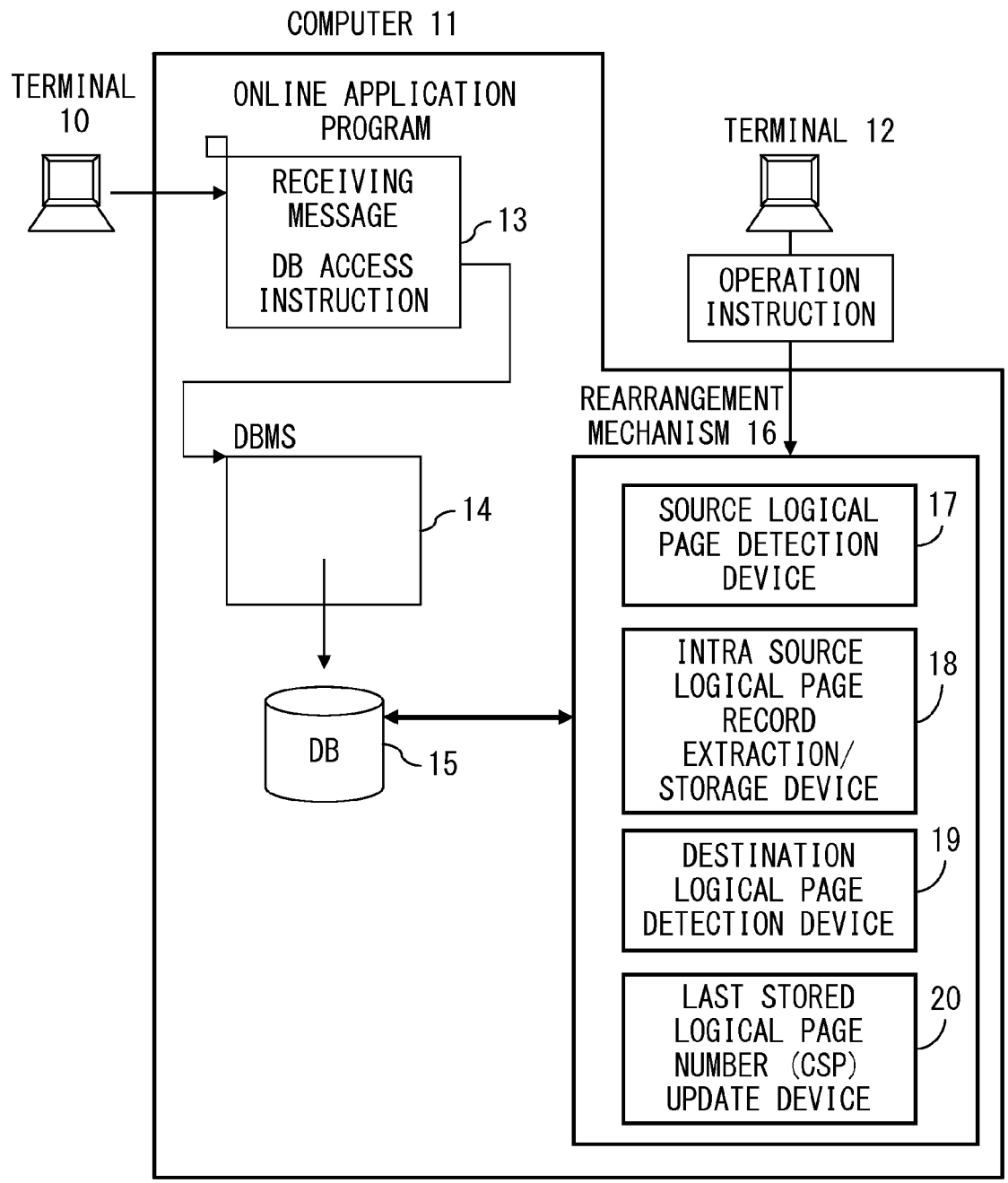
F I G. 5

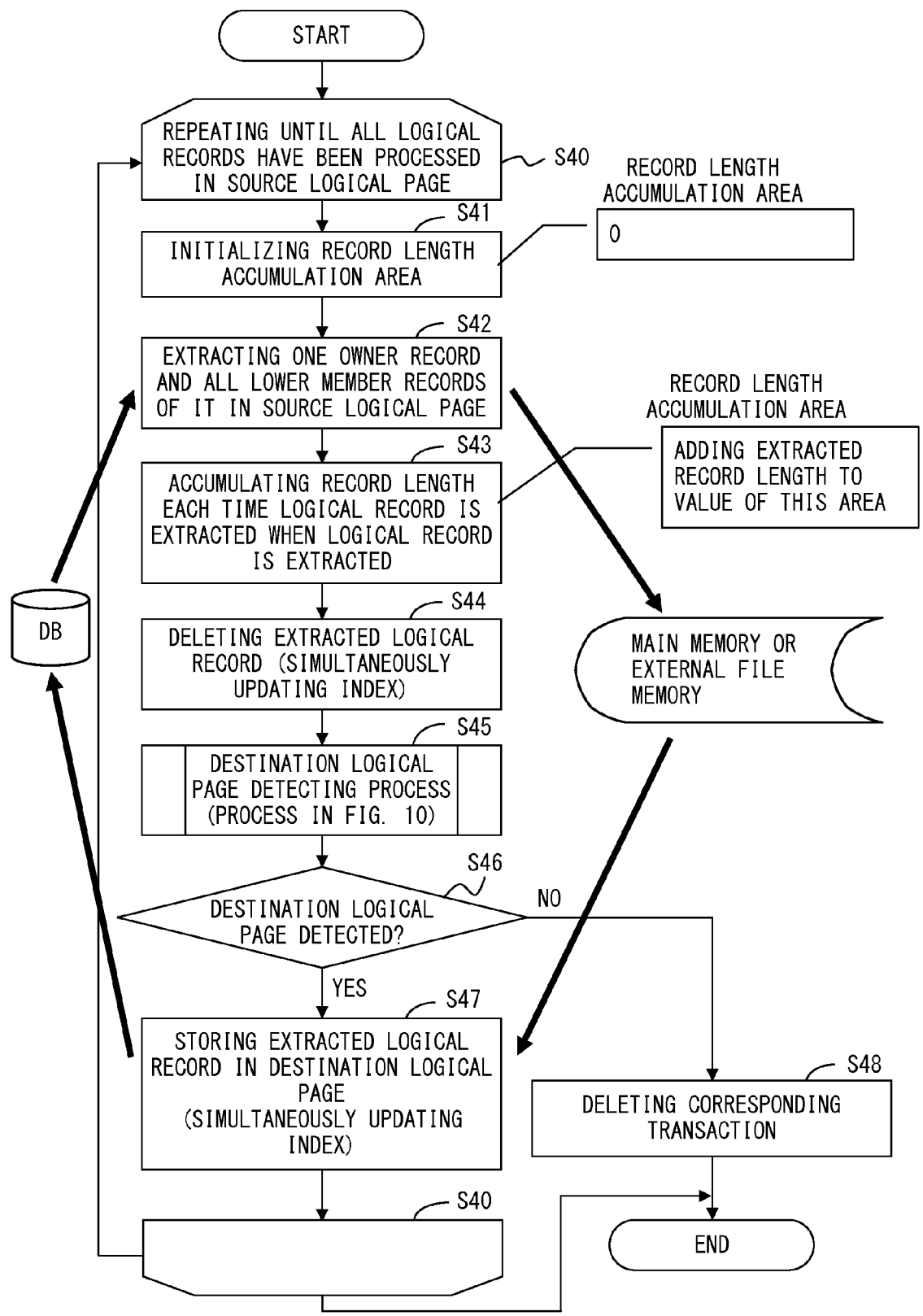
F I G. 9

☐CONCRETE EXAMPLE OF CONFIGURATION OF SUBRANGE
【 LOGICAL STRUCTURE 】
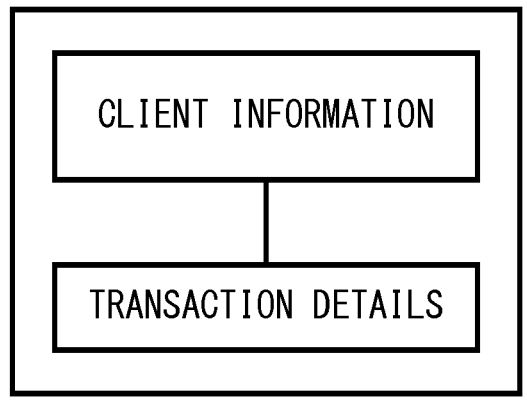
F I G. 1 2 A

DATABASE APPARATUS

CROSS-REFERENCE TO RELATED APPLICATIONS

This application is based upon and claims the benefit of priority of the prior Japanese Patent Application No. 2010-123031, filed on May 28, 2010, the entire contents of which are incorporated herein by reference.

FIELD

The present invention relates to a database apparatus.

BACKGROUND

Recently in banks, public offices, broker houses, etc., a huge amount of data is accumulated in a database for use in daily work. The database used in the work is generally used in a sequentially accessing method (SAM). The SAM is a method in which data is stored in a storage area in order sequentially from the leading position toward the trailing position, and the storage area of new data is located after the area in which the current data is stored. The operation performed on the database is adding, amending, copying, and deleting data. When data is deleted, the storage area in which the deleted data had been stored becomes a space area. However, in a database in the SAM, new data is added to the end of the storage area of all stored data. Therefore, the space area generated by deleting data remains unused. If the unused status is left as is, the storage area of the database is occupied by a number of space areas, and only a small amount of data is stored to fill the database. Therefore, when there is a space area, data is rearranged to fill space areas.

the rearrangement of a database in the SAM is performed by delimiting logical data, that is, in subranges. A subrange is, for example, a group of data of all clients processed by one branch office when the data of clients is managed by each branch office for the database of a bank. A user of a database can arbitrarily set a subrange, but a subrange is generally a group of logical pages storing a plurality of logical records (smallest unit of data). A logical record is, for example, passbook data for each client in a database of a bank. A subrange is a unit of sequential data access, and data is stored in order from the leading position to the trailing position in the subrange, but each subrange is independent of one another.

FIG. 1 illustrates the concept of the prior art.

Since it is necessary to rearrange the entire records in a subrange in order from the leading position, the entire logical records in the subrange are temporarily extracted and then stored again. In this case, since the entire subrange to be rearranged is exclusively controlled, the subrange cannot be used online during the rearrangement. The entire subrange is exclusively controlled because the rearrangement is realized by temporarily extracting the logical records in the entire subrange and storing the records again.

The access to a database can be an online process of operating data of the database, and a rearranging process of the data in the database, but it is necessary to perform exclusive control of the database to perform respective processes. Since the conventional rearranging process has been exclusively controlled in unit of a subrange, the subrange cannot be accessed online during the rearrangement. In a database of a bank, when a subrange is a unit of a branch office, all data cannot be accessed during the rearrangement if the rearranging process is performed. Therefore, it has been necessary to perform the rearranging process on Saturdays or Sundays when the branch office is closed.

FIGS. 2A and 2B are explanatory views of the conventional rearranging process.

In FIG. 2A, it is assumed that the database stores logical records on logical pages 0 through 3, and there are deletion areas (space areas) on the logical pages 0 through 2. In this example, it is assumed that the subrange is configured by the logical pages 0 through 3. In the database, the current store point (CSP) of the logical record is registered. In this case, the CSP is 3. A new record is stored in the logical page indicated by the CSP and the subsequent pages.

In FIG. 2B, the logical records in the entire subrange are copied to another storage area, all logical records on the logical pages 0 through 3 are deleted, and then the logical records in the entire subrange are stored again. Since there are four logical records in the case illustrated in FIG. 2B, and one logical page can store two logical records, all logical records are stored in the logical pages 0 and 1 if the logical records are stored again in order from the leading position. Then, the CSP is reset to 1.

Other prior arts can be a database re-organization device using a cluster as a logical group of records to be processed, a database re-organizing system having a disk drive for managing files on logically divided pages and moving the contents of a source page being used at the rear portion of a moved data unit to the destination page as a deleted page or an unused page.

PRIOR ART DOCUMENTS

Patent Document

[Patent Document 1] Japanese Laid-open Patent Publication No. 5-289913

[Patent Document 2] Japanese Laid-open Patent Publication No. 2009-20793

SUMMARY

The database apparatus according to an aspect of the following embodiments uses a sequentially accessing method of sequentially storing a logical record from the leading position of a subrange configured by a plurality of logical pages, and includes: a source logical page detection unit for detecting a logical record to be sequentially moved from the rear portion of the subrange, and setting the logical page including the logical record to be moved as a source logical page of a logical page; a destination logical page detection unit for sequentially detecting space areas from the leading position of the subrange, and setting a logical page including the space area to which the logical record to be moved can be moved as a destination logical page of a logical record; and a logical record movement unit for performing exclusive control only on the destination logical page and the source logical page, and moving the logical record to be moved from the source logical page to the space area of the destination logical page.

The following embodiments provide a database apparatus in the SAM capable of performing a rearranging process without stopping online applications.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 4B is a view (No. 2) of the rearranging process according to an embodiment of the present invention;

FIG. 5 is a configuration of the system of the database apparatus according to an embodiment of the present invention;

FIG. 9 is a flowchart (No. 4) for explanation of the process according to an embodiment of the present invention;

FIGS. 12A and 12B are explanatory views (No. 1) of the data structure of an embodiment of the present invention;

DESCRIPTION OF EMBODIMENTS

In the following embodiment, a database is used in an online application. The embodiment is applicable in an environment in which the online operation cannot be stopped, or even if it can be stopped, the online operation cannot be stopped for a long time for rearranging the database.

Figure 1:
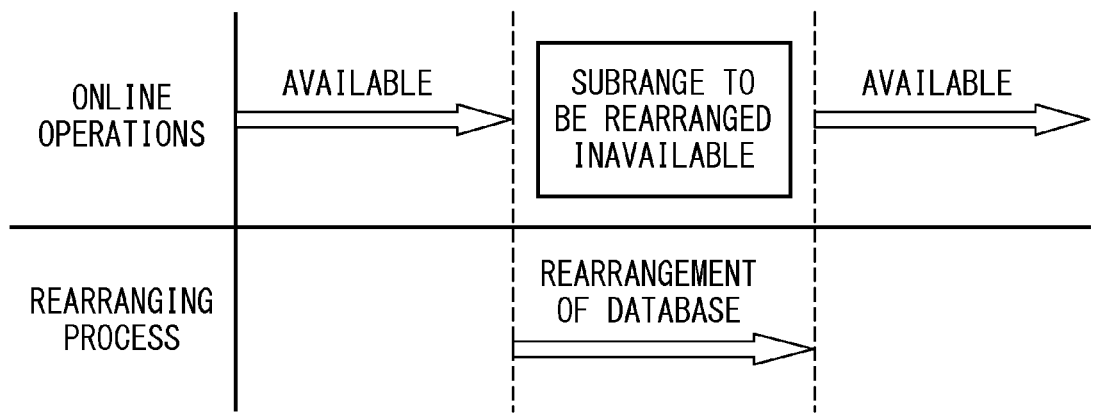
FIG. 1 illustrates the concept of the prior art.
Figure 2A:
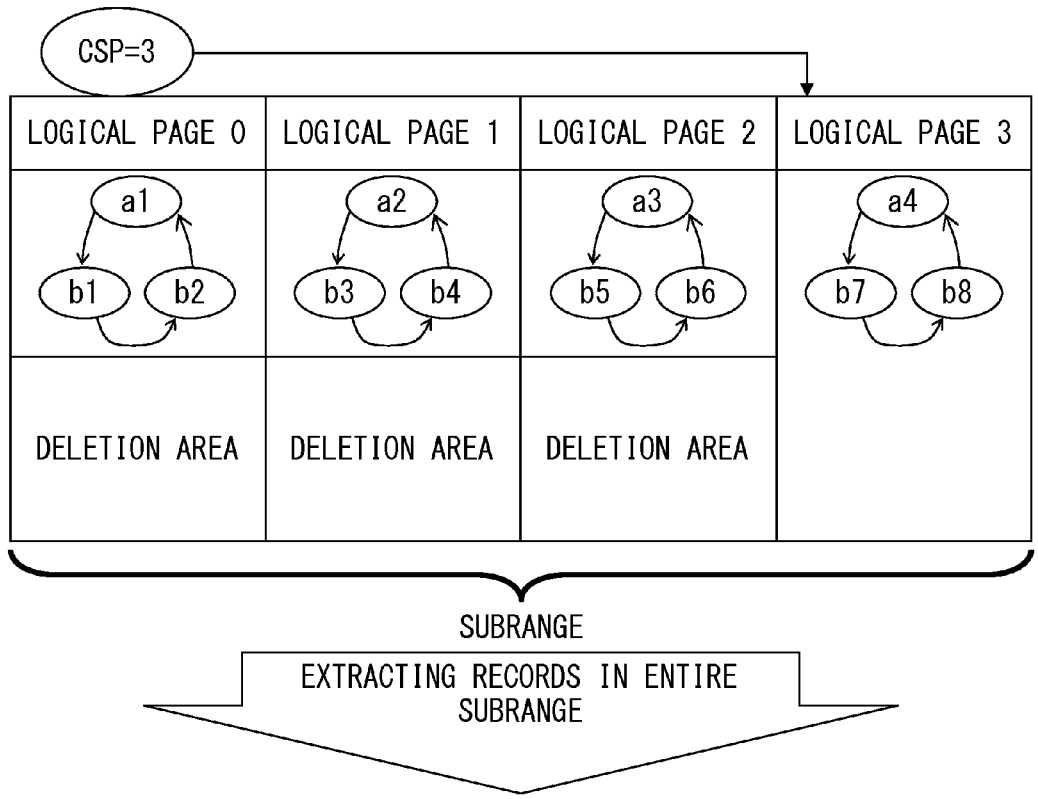
FIG. 2A is an explanatory view (No. 1) of the conventional rearranging process.
Figure 2B:
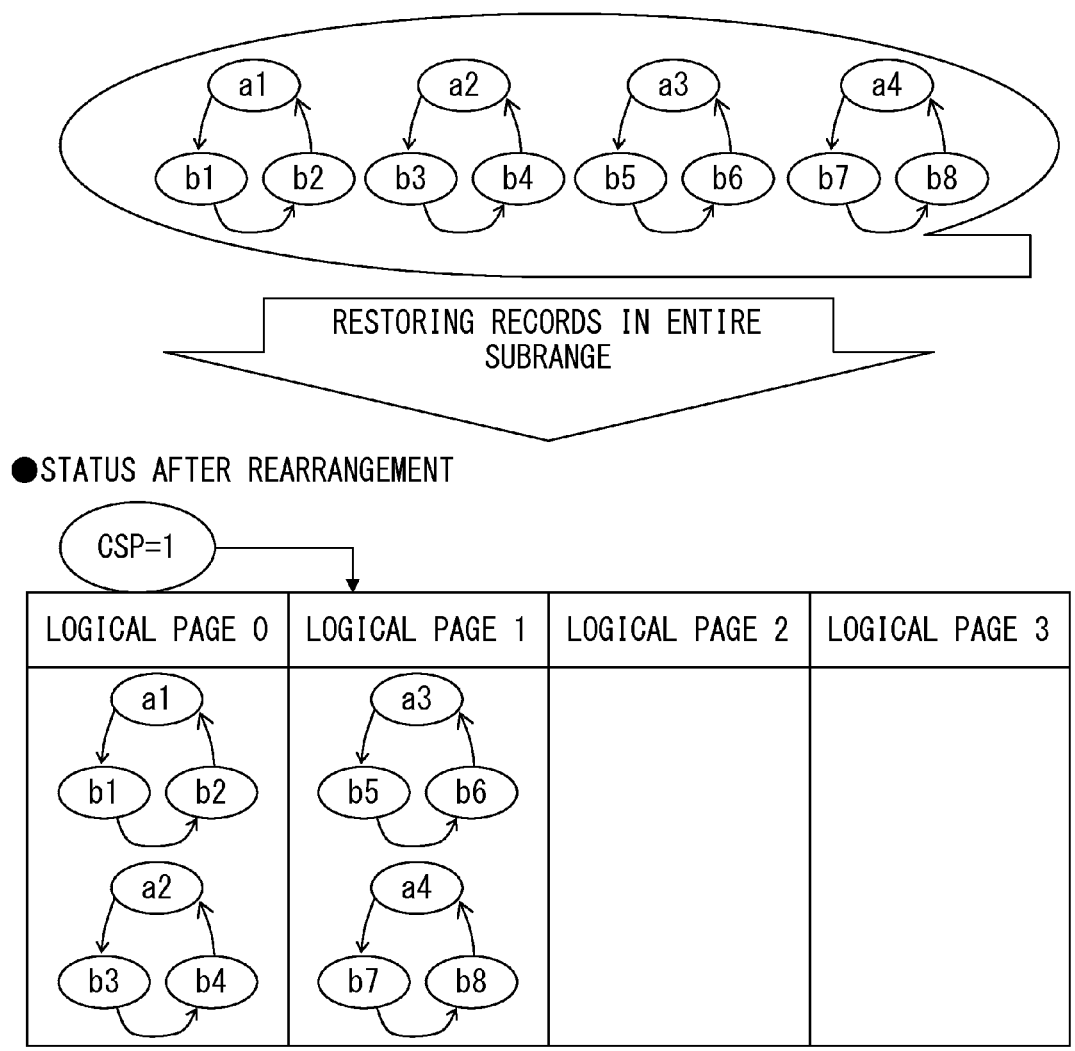
FIG. 2B is an explanatory view (No. 2) of the conventional rearranging process.
Figure 3:
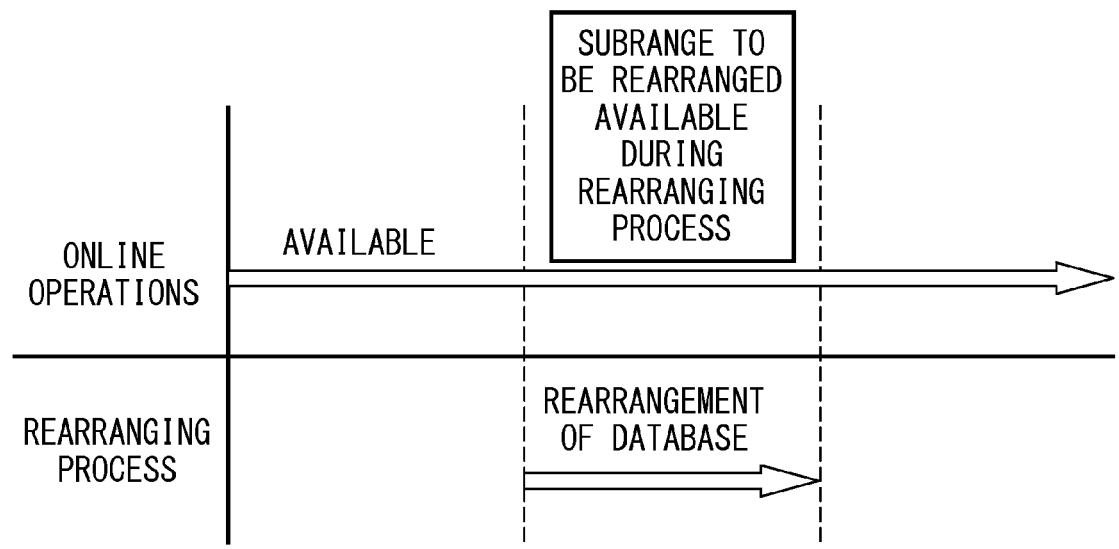
FIG. 3 is an explanatory view of the concept of an embodiment of the present invention.

FIG. 3 is an explanatory view of the concept of an embodiment of the present invention.

In the present embodiment, the entire subrange is not collectively rearranged, but exclusive control is performed on each logical page as the smallest unit for the exclusive control, and the rearrangement is performed in the logical records (one owner record and the lower member records) in the logical page.

The rearrangement is performed in logical record units because transaction processing is performed in the logical record units, and one logical record is not divided, but stored in the same logical page, thereby assuming that a logical record can be the smallest unit in the rearranging process.

In addition, by limiting the exclusive range to the logical page to be rearranged (the source/destination logical page to which the logical record is moved), the logical pages other than those to be rearranged are available online.

As described later, the source logical page of the logical records is sequentially set in order from one page before the trailing page in the subrange toward the leading page, and the destination logical page of the logical records is sequentially set in order from the leading page in the subrange toward the trailing page. Thus, the logical records to be moved can be minimized, thereby shortening the time required for the rearrangement. In addition, by minimizing the logical records to be moved, the influence of the update of the index on the online operation can also be minimized.

The index is held with the key value for specification of a logical record associated with the storage location of the logical record. When a logical record is retrieved, the key value of a target logical record is searched for in the index, and the storage position of the logical record having a desired key value is acquired from the index. By acquiring the data of the logical record from the acquired storage position, the desired data can be acquired. The key value of a logical record can be a personal account number in the database of a bank, etc.

The above-mentioned rearranging method is to arrange a logical record in a backward logical record in a forward space area. When a source logical page of logical records is set from the leading position toward the backward position, a space area is detected in the middle of the subrange by moving the logical record in the source logical page, thereby making it necessary to store all subsequent logical records in order from the leading position. That is, since all logical records in and after the space area are to be moved, there is an increasing number of logical records to be moved. In the above-mentioned rearranging method in which a backward logical record is moved forward, since a space area generated by the rearrangement is detected in the backward position in a subrange, it is not necessary to move the logical records to fill the space area generated as described above. Therefore, the number of logical records to be moved can be reduced.

In this rearranging method, the storage order of each logical record (physical position in the subrange) is different between before and after the rearrangement. However, since each logical record is retrieved by a logical key value, there occurs no problem. By the conflict between the rearranging process and the online process, there may occur a wait for exclusive control in logical page units, but the wait for the exclusive control is at the same level as the conflict between the normal online processes, thereby incurring no problem. The details of a logical record are described later.

As illustrated in FIG. 3, since only the source logical page and the destination logical page are exclusively controlled in the rearranging process according to the present embodiment, the entire subrange is not exclusively controlled. Therefore, even during the rearranging process, the logical pages other than the source logical page and the destination logical page can be accessed to perform online operations. That is, when the subrange includes data of a branch office of a bank, the data of the branch office can be accessed even when the data of the branch office is rearranged. Therefore, it is not necessary to stop the operations of the branch office.

FIGS. 4A through 4D illustrate the rearranging process according to the present embodiment.

In the present embodiment, the rearrangement of a logical record is realized in the following method.

Figure 4A:
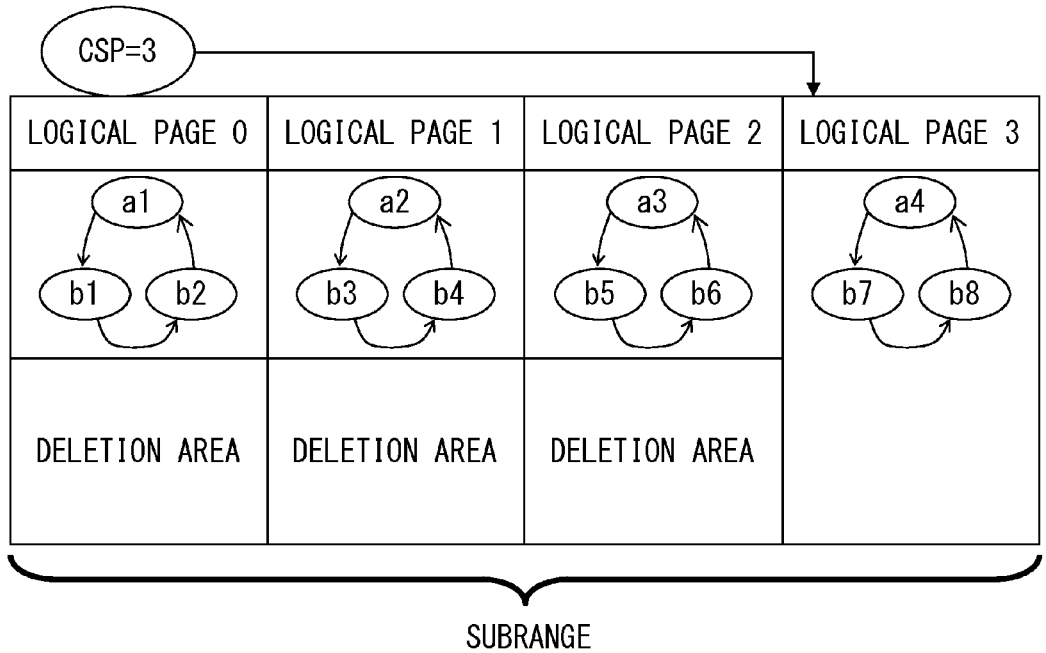
FIG. 4A is a view (No. 1) of the rearranging process according to an embodiment of the present invention.
Figure 4C:
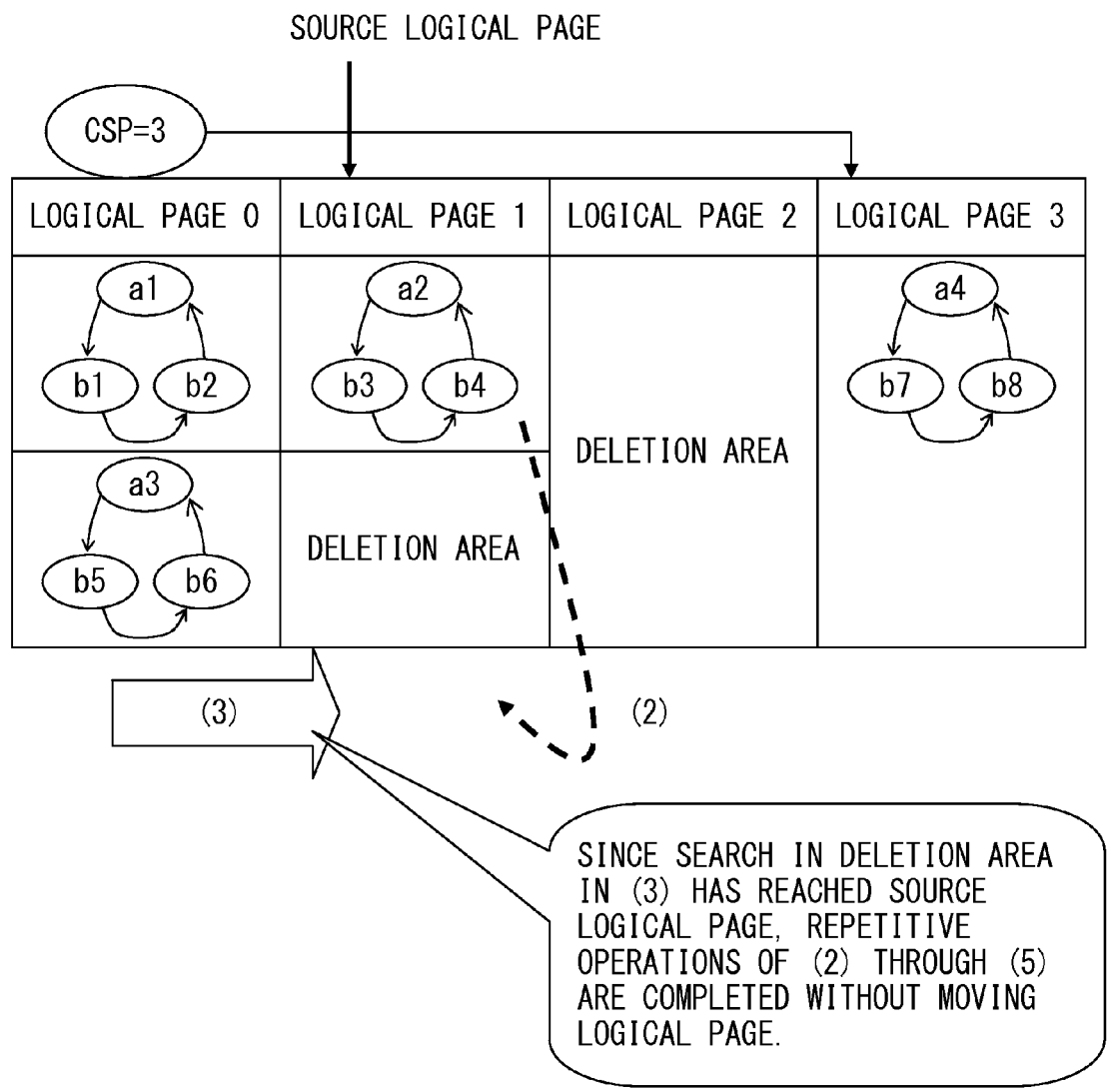
FIG. 4C is a view (No. 3) of the rearranging process according to an embodiment of the present invention.
Figure 4D:
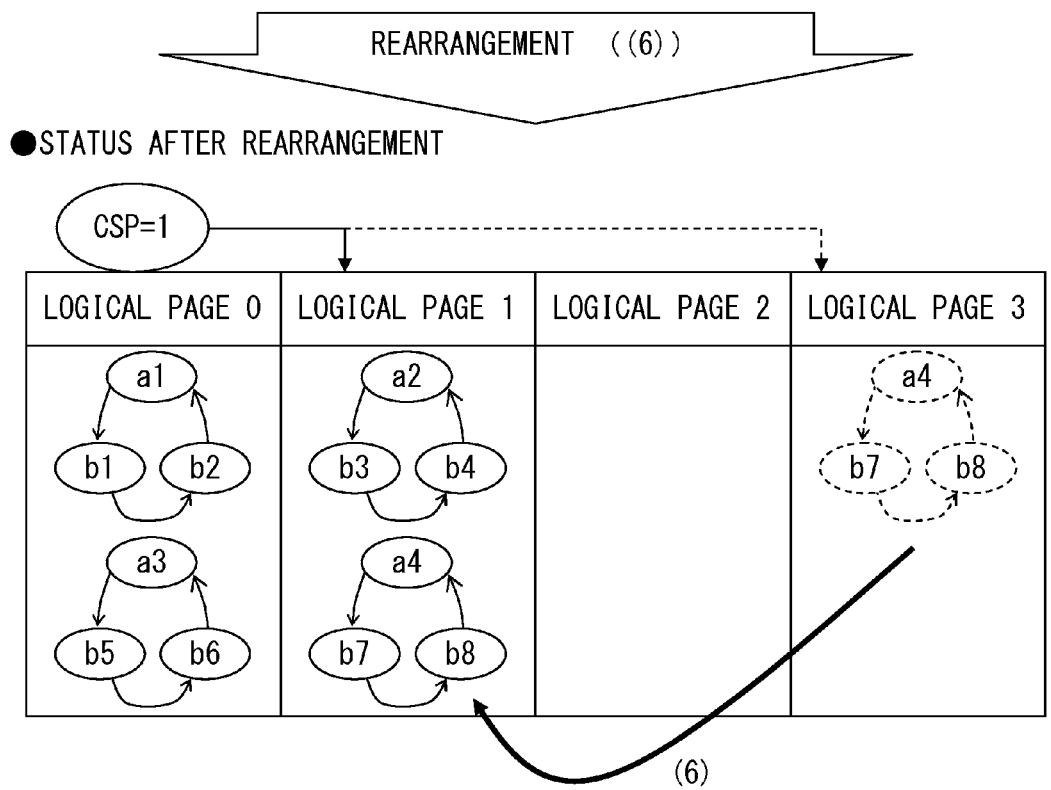
FIG. 4D is a view (No. 4) of the rearranging process according to an embodiment of the present invention.

First, assume that the arrangement of the logical records in the database is made as illustrated in FIG. 4A. First, the logical page of the "last stored logical page number-1 indicated by the CSP" is set as a source logical page (1). The processes (2) through (5) are repeated until there is no deletion area (or space area) in which logical records can be rearranged (until the retrieval of a deletion area in (3) below reaches the source logical page).

The records stored in the source logical page are extracted as the records to be rearranged (2). A deletion area in which the logical record extracted in (2) is retrieved without exclusive control from the leading logical page of the subrange. In the second and subsequent retrieving processes, the retrieval is performed in order from the destination logical page in the previous retrieving process, not from the leading logical page of the subrange (3).

If a deletion area is detected, a logical record is moved. In this case, only the source and destination logical pages relating to the logical record are exclusively controlled. When the movement is completed, the exclusive control is released (4). When the source logical page becomes a space area by moving the logical record, the source logical page is forwarded (5). Finally, the logical record in the logical page of the "last stored logical page number-1 indicated by the CSP" is moved to the logical page in which data can be stored by the repetitive processes (2) through (5) above (by the rearrangement of the logical record), and the update is performed so that the CSP indicates the destination logical page of the trailing logical record (6). Since the processes (2) and (3) are retrieving processes, they are not indicated with specific descriptions.

By performing the rearranging process in two separate phases (2) through (5) and (6), a new logical record can be stored while a large amount of rearrangement is being performed by repeating the phases (2) through (5). Then, if the CSP is forwarded by storing the new logical record, then the logical page from the forwarded CSP-1 to the CSP before the forwarding operation is set as a source logical page, the phases (2) through (5) are repeated, and the phase (6) is performed, thereby terminating the process.

In the present embodiment, the access by the online operations on the subrange can be gained during the rearranging process. Therefore, a new logical record may be added in the online operations before completing the rearranging process. In the present embodiment, a database in the SAM is used. Accordingly, the new logical record is added after the trailing page of the currently stored logical record. In the rearranging method, the logical page in which the trailing record of the currently stored logical records is stored is finally rearranged. Until then, the trailing logical page is maintained as is. Therefore, the new logical record is stored backward in the trailing logical page. Since the trailing logical page at the start of the rearranging process is fixed during the rearrangement, a new logical page can be added.

FIG. 5 is a configuration of the system of the database apparatus according to the present embodiment.

The system of the database apparatus according to the present embodiment includes: a terminal 10 used by a user of a database; a computer 11 having a database 15; and a terminal 12 instructing the rearrangement of a logical record in the database 15. The terminal 10 is to perform online operations such as adding, correcting, deleting, and copying data in the database. When the system is used in performing banking operations, the terminal 10 is an ATM etc. The terminal 12 is a managing terminal for instructing the computer 11 to rearrange the data in the database 15.

Installed on the computer 11 is an online application program 13 for accepting access from the terminal 10 to the database 15, and performing online operations. The online application program 13 receives a message from the terminal 10, and issues to a database management system 14 an instruction to access the database 15. The database management system (DBMS) 14 controls access to the database 15. The database management system 14 controls the hardware of the database 15 when the online operations such as adding, correcting, deleting, and copying data are performed in the database 15. The database management system 14 controls the database 15 in the accessing system using the SAM. The database 15 stores a logical record in logical page units.

A rearrangement mechanism 16 rearranges the logical records of the database 15 according to an operation instruction from the terminal 12. The rearrangement mechanism 16 includes a source logical page detection device 17, an intra source logical page record extraction/storage device 18, a destination logical page detection device 19, and a last stored logical page number (CSP) update device 20. Starting with the logical page immediately before the trailing logical page of the subrange, the source logical page detection device 17 sequentially detects a logical page storing a logical record. The source logical page detection device 17 also has a source logical page number management area, and stores a source logical page number of a logical record currently being rearranged. The intra source logical page record extraction/storage device 18 copies the logical record in the source logical page, deletes from the database 15 the logical record corresponding to the copied logical record, and stores the copied logical record on the destination logical page. The destination logical page detection device 19 sequentially searches for a space area starting with the leading logical page of the subrange. In the detected space areas, the logical page to which a space area capable of storing the source logical record belongs is set as a destination logical page. The last stored logical page number (CSP) update device 20 updates the trailing logical page number storing the logical record which has been changed by storing the logical record by the rearrangement in order from the leading position in the storage area of the subrange. The last stored logical page number (CSP) is stored in the database 15, and the CSP stored in the database 15 is updated.

FIGS. 6 through 11 are flowcharts for explanation of the process according to the present embodiment.

Figure 6:
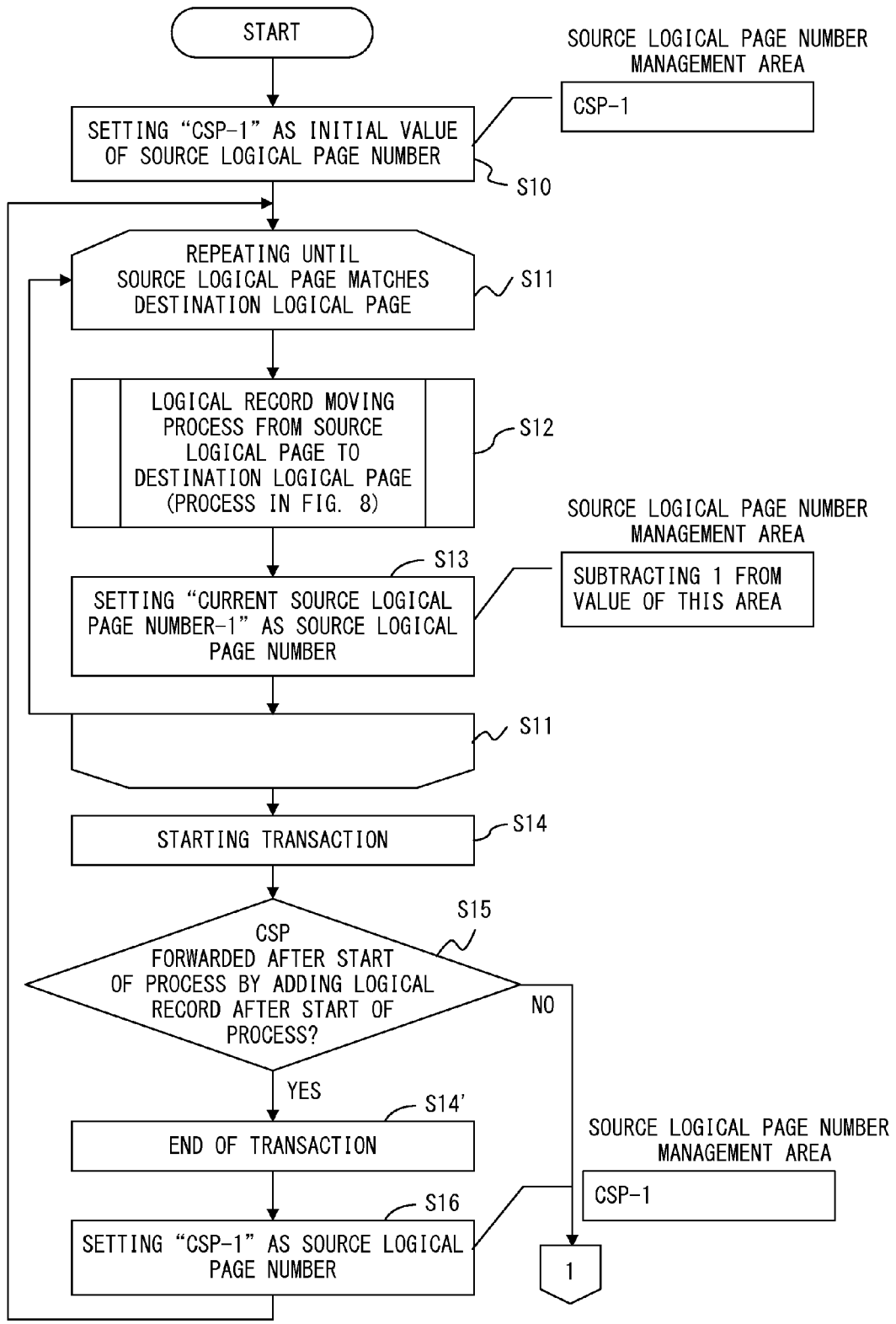
FIG. 6 is a flowchart (No. 1) for explanation of the process according to an embodiment of the present invention.
Figure 7:
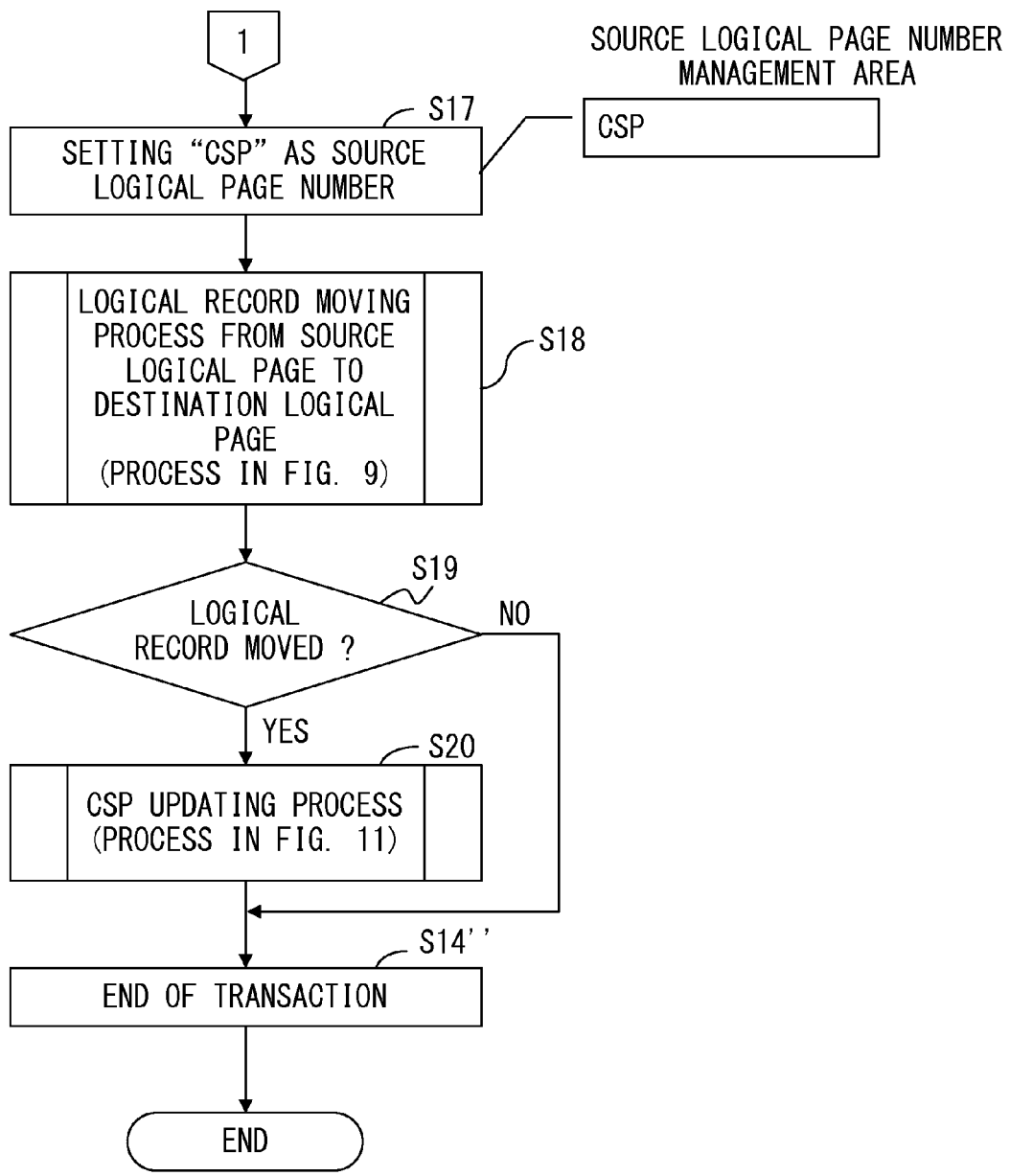
FIG. 7 is a flowchart (No. 2) for explanation of the process according to an embodiment of the present invention.

FIGS. 6 and 7 are flowcharts of the entire process of detecting a source logical page.

First, in step S10, "CSP-1" is set as an initial value of the source logical page number, and "CSP-1" is stored in the source logical page number management area. The CSP as a last stored logical page number is stored in the database, and read by the source logical page detection device from the database, thereby acquiring the value of the CSP. Then, the value obtained by subtracting 1 from the CSP is stored in the source logical page number management area.

In the loop in step S11, the processes in steps S12 and S13 are repeated until the source logical page and the destination logical page match each other. In step S12, a logical record is moved from the source logical page to the destination logical page. The process in step S12 is described later in detail with reference to FIG. 8. In step S13, the "current source logical page number-1" is set as a source logical page number. In step S14, a transaction of the rearranging process is started.

In step S15, after the rearranging process is started, a new logical record is added in the online operations, and it is determined whether or not the CSP has been forwarded after the start of the rearranging process. In this process, the CSP is exclusively controlled to prevent the CSP from being forwarded. It can be determined whether or not the CSP has been forwarded by comparing the CSP-1 stored in the source logical page number management area first in the rearranging process with the value obtained by subtracting 1 from the current CSP. If the determination in step S15 is YES, the exclusive control performed on the CSP in step 15 is terminated and the transaction of the rearranging process is terminated in step S14'. Then, in step S16, the "CSP-1" is set as a source logical page number, and control is returned to step S11. Thus, when a new logical record is added, the rearranging process is started for the new logical records up to the trailing logical page. That is, in the processes up to step S11, the rearrangement of the existing logical records is completed. However, since a new logical record is added to and after the trailing logical page, a space area occurs between the rearranged logical record and the new logical record. To fill the space area, the rearranging process is continued including the new logical record.

When the determination in step S15 is NO, "CSP" is set as a source logical page number, and the value of the CSP is stored in the source logical page number management area in step S17. Thus, the setting of the movement of the logical record on the trailing logical page, which has been left alone, is performed.

In step S18, the process of moving the logical record from the source logical page to the destination logical page is performed. The process in step S18 is described later in detail with reference to FIG. 9. In step S19, it is determined based on the existence of a space area whether or not a logical record has been moved. When the determination in step S19 is NO, the process is terminated after completing a transaction in step S14". If the determination in step S19 is YES, the CSP updating process of updating the CSP into the value of the latest trailing logical page is performed in step S20. The process in step S20 is described later in detail with reference to FIG. 11. In step S14", the transaction of the rearranging process is terminated. In step S14", the exclusive control of the CSP in step 15 and the exclusive control of the source and destination logical pages in step S18 is terminated, thereby terminating the transaction.

As described above, the start of the end of the transaction of the rearranging process is finely set for each process. Thus, the periods of the exclusive control of the source and destination logical pages by the transaction of the rearranging process is shortened, thereby mostly preventing the conflict with the transactions for online operations.

Figure 8:
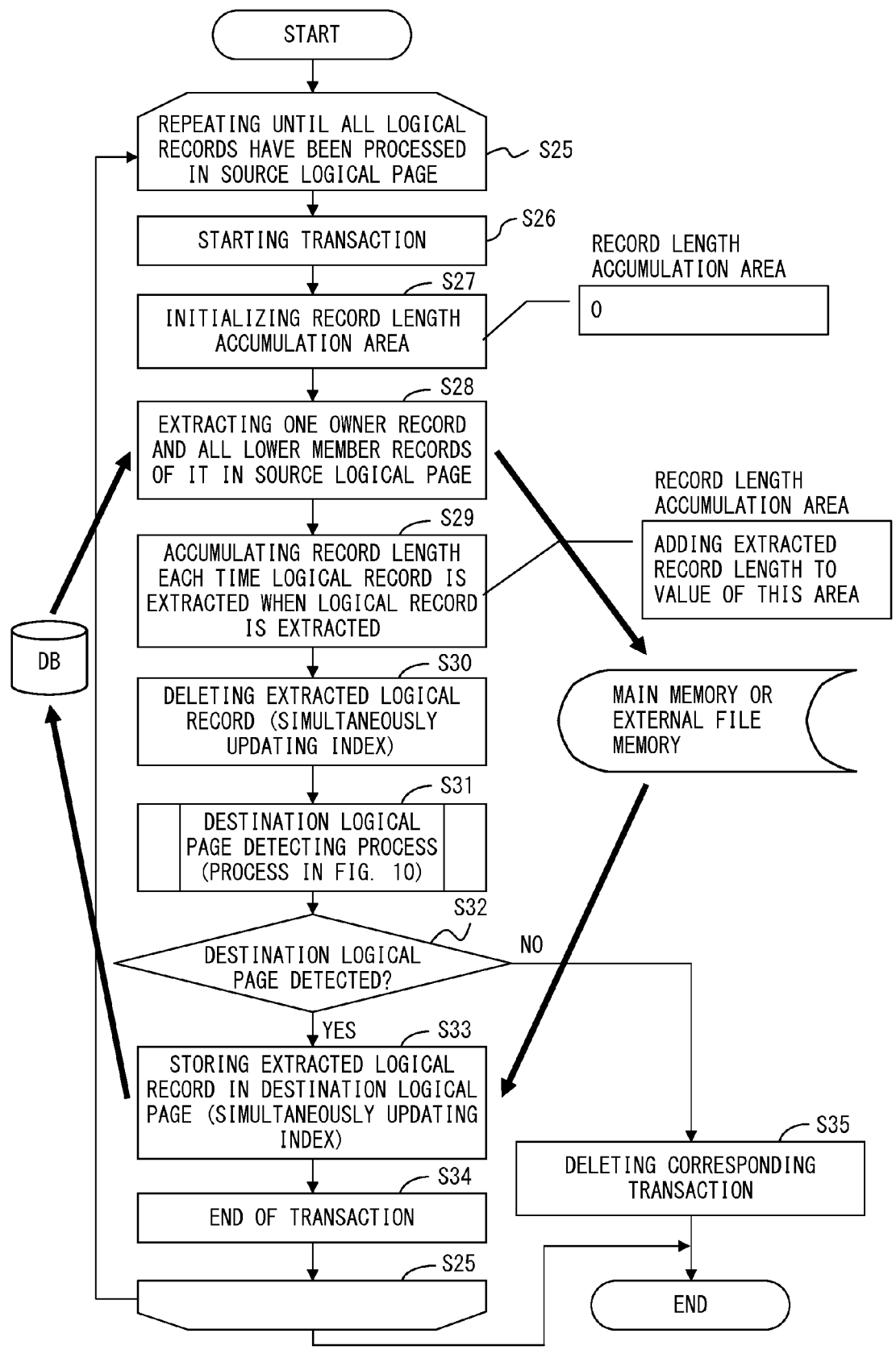
FIG. 8 is a flowchart (No. 3) for explanation of the process according to an embodiment of the present invention.

FIG. 8 illustrates in detail the process illustrated in step S12, and is a flowchart of extracting a record in the source logical page and storing a logical record (whose source logical page number is not the CSP).

In the loop in step S25, the process is repeated until all logical records in the source logical page have been processed. In step S26, the transaction of the rearranging process is started, and the exclusive control is performed on the source logical page. The exclusive control of the destination logical page is performed in step S31. In step S27, the value of the record length accumulation area as a variable storage area is initialized to 0. In step S28, one owner record in the source logical page and lower all member records (totally referred to as one logical record) are extracted from the database. The logical record is stored in the main memory or external file memory. In step S28, the process is performed with exclusive control executed on the source logical page.

In step S29, when a logical record is extracted, a record length is accumulated for each logical record. That is, the record length of the extracted logical record is added to the value stored in the record length accumulation area. In step S30, the extracted record is deleted from the database, and the index is updated with the deletion of the logical record.

In step S31, a destination logical page detecting process is performed. The details of the process in step S31 are described later with reference to FIG. 10. In step S32, it is determined whether or not a destination logical page has been detected. If the determination in step S32 is NO, the transaction of the current rearranging process is cancelled and the process is terminated in step S35.

If the determination in step S32 is YES, the extracted logical record read from the main memory or external file memory is stored on the destination logical page of the database, and the index is simultaneously updated. When the process in step S33 is terminated, the exclusive control is terminated. In step S34, the transaction of the rearranging process is terminated. In step S34, the exclusive control of the source logical page performed in step S28 and the exclusive control of the destination logical page performed in step S31 are released, and the transaction is terminated. When the loop in step S25 is completed, the process is terminated.

FIG. 9 illustrates the details of the process in step S18 in FIG. 7, and is a flowchart of extracting a record in the source logical page and storing a logical record on the destination logical page (the source logical page number is the CSP).

In the loop in step S40, the process is repeated until all logical records in the source logical page have been processed. In step S41, the record length accumulation area as a variable storage area is initialized. To be concrete, the value of the record length accumulation area is set to 0. In step S42, one owner record in the source logical page and lower all member records (totally referred to as one logical record) are extracted from the database. The extracted logical record is stored in the main memory or external file memory. In step S42, the source logical page is exclusively controlled.

In step S43, when a logical record is extracted, a record length is accumulated each time one logical record is extracted. That is, the record length of the extracted logical record is added to the value stored in the record length accumulation area. In step S44, the extracted record is deleted from the database, and the index is updated. In step S45, a destination logical page detecting process is performed. The details of the process in step S45 are described later with reference to FIG. 10.

In step S46, it is determined whether or not a destination logical page has been detected. If the determination in step S46 is NO, the transaction of the current rearranging process is cancelled and the process is terminated in step S48. If the determination in step S46 is YES, the extracted logical record read from the main memory or external file memory is stored on the destination logical page of the database, and the index is simultaneously updated. When the loop in step S40 is terminated, the process is terminated.

Figure 10:
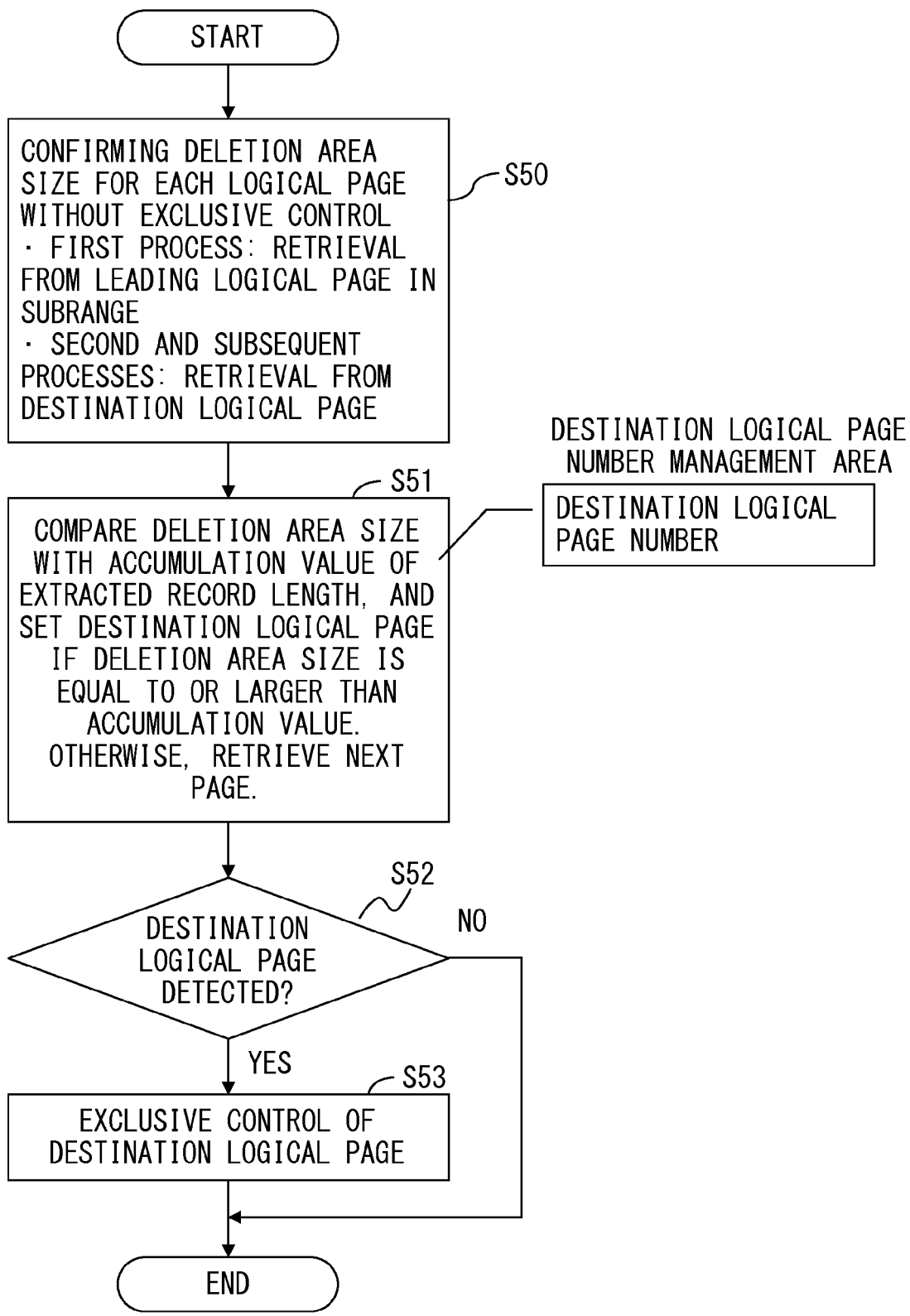
FIG. 10 is a flowchart (No. 5) for explanation of the process according to an embodiment of the present invention.

FIG. 10 illustrates the details of the processes in step S31 in FIG. 8 and in step S45 in FIG. 9, and a flowchart of detecting the destination logical page.

In step S50, the exclusive control is not performed, and the size of the deletion area (space area) for each logical page is confirmed. In detecting the first destination logical page after starting the rearrangement, the retrieval is performed backward from the leading logical page in the subrange. In detecting the destination logical page second or subsequent times, the retrieval is performed backward from the previous destination logical page. In step S51, the deletion area size is compared with the accumulation value of the record lengths of the extracted logical records. If the deletion area size is equal to or larger than the value, the current logical page is set as the destination logical page. The destination logical page number is stored in the destination logical page number management area as a variable storage area. When the conditions above do not hold, the next logical page is searched for. The search is performed up to the source logical page, thereby terminating the process.

In step S52, it is determined whether or not the destination logical page has been detected. If the determination in step S52 is NO, the process is terminated. If the determination in step S52 is YES, then the destination logical page is exclusively controlled and the process is terminated in step S53.

Figure 11:
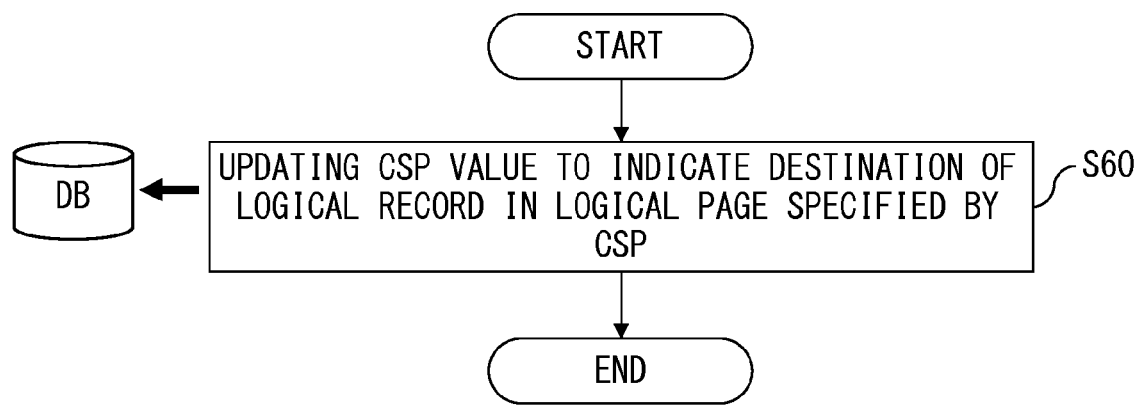
FIG. 11 is a flowchart (No. 6) for explanation of the process according to an embodiment of the present invention.

FIG. 11 illustrates the details of the process in step S20 in FIG. 7, and is a flowchart of updating the last stored logical page number (CSP).

In step S60, the value of the CSP stored in the database is updated so that it indicates the destination of the trailing logical record in the logical page indicated by the CSP. That is, the CSP of the database is updated by the value of the destination logical page number management area. That is, in the final step in the rearranging process, the destination logical page of the trailing logical record stored in the last stored logical page is the last stored logical page after the rearranging process, and therefore the update is performed so that the CSP stored in the database can be the last stored logical page.

Figure 12B:
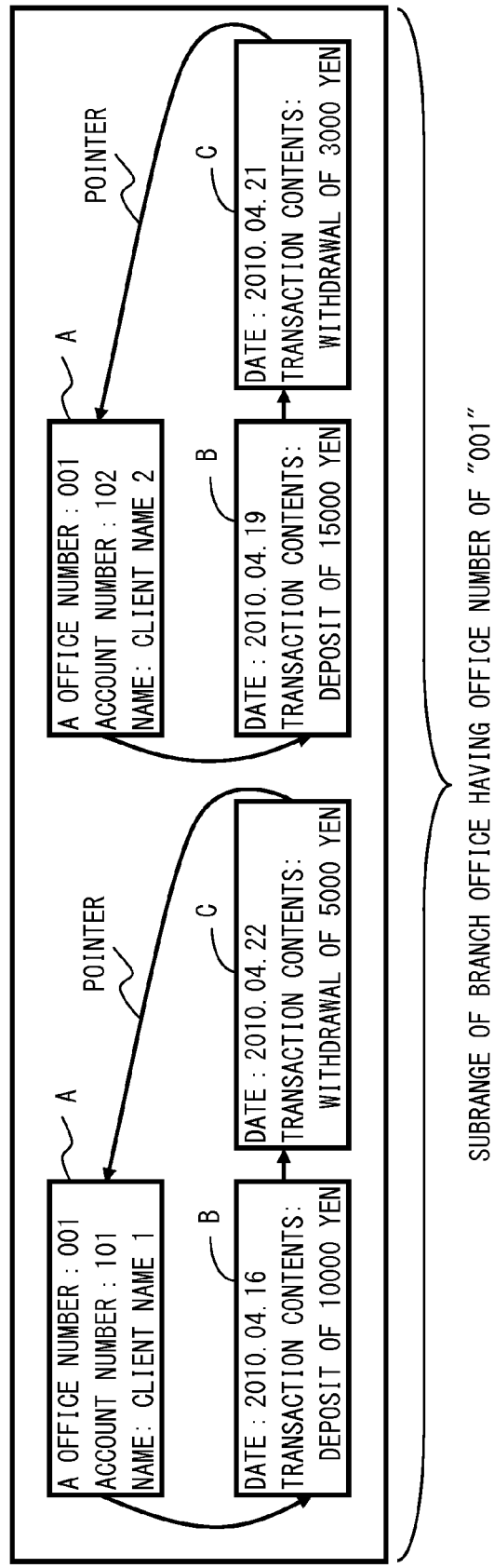
Figure 13:
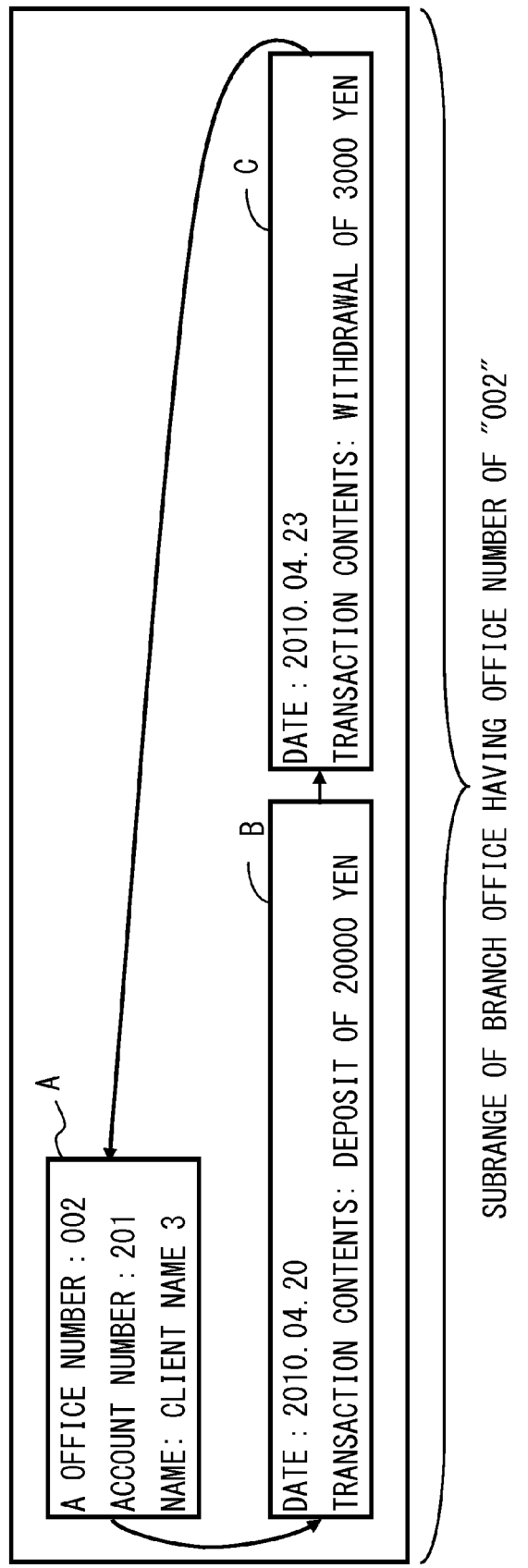
FIG. 13 is an explanatory view (No. 2) of the data structure of an embodiment of the present invention.
Figure 14:
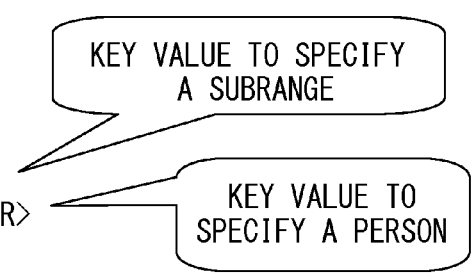
FIG. 14 is an explanatory view (No. 3) of the data structure of an embodiment of the present invention.

FIGS. 12 through 14 are explanatory views of the data structure according to the present embodiment.

FIGS. 12 through 14 illustrate the data structure according to the present embodiment using the client data of a bank as an example.

FIGS. 12A, 12B, and 13 are explanatory views of the logical structure of the data and the configuration of the subrange.

The logical structure of the data indicates the client information for specification of a client associated with the details of a transaction describing the transaction contents of the client as illustrated in FIG. 12A.

A subrange is a plurality of logical pages each having a plurality of logical records. As illustrated in FIG. 12B, a subrange is a group of logical records specified by the office number "001" of a branch. FIG. 12B illustrates only two logical records. Therefore, there is only one logical page in this case. The logical page is configured by an owner record indicting client information and a member record indicating transaction details. In the case illustrated in FIG. 12B, the owner record is the data A including an office number, an account number, and the name of a client. The data B and C are member records of the data A and include the transaction date and the transaction contents. A pointer to the data B, one of the member records, is set from the owner record A. A pointer is also set to the data C, one of the member records, from the data B. From the data C, the trailing data of the member records, a pointer to the data A which is the owner record is set. Thus, one logical record is configured as a series of associated data using the pointers set among the owner record and lower member records.

FIG. 13 is an example of a logical record belonging to the subrange different from that illustrated in FIG. 12B. The configuration of the logical record is the same as that illustrated in FIG. 12B, and the data A of the owner record and the data B and C of the lower member records are associated with one another by the pointers. Since the subrange is set by the office number of a branch office, a logical record having a different office number belongs to a different subrange. The office number of the logical record in FIG. 12B is "001" while the office number of the logical record in FIG. 13 is "002", and a different subrange is specified by the office number held by the owner record.

FIG. 14 is an example of displaying the data structure in FIGS. 12A, 12B, and 13 as structured data with a tag.

A logical record is a group of data enclosed by <client information> and </client information>. The logical record holds an office number configured by <office number> and </office number>. The office number is a key value for specification a subrange, and is used in detecting client information. In addition, each logical record holds an account number expressed by <account number> and </account number> as a key value for specification of a person. The information about an account of a specific person can be retrieved using the account number as a key value. The key value is registered in the index. The logical record further holds the transaction details including the name of the client, the transaction date, and the transaction contents.

In the database in the SAM, when a record in a subrange is deleted, and the deletion area is to be reused, it is necessary to rearrange the database. However, according to the present embodiment described above, the rearrangement can be realized without stopping the online operations. In addition, the records in the entire subrange are not rearranged, but only the minimal number of records can be rearranged, thereby considerably reducing the time required to rearrange the records.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A database apparatus sequentially stores logical records from a leading position of a subrange, the database apparatus comprising:
    a processor detects a logical record to be moved from a rear portion of the subrange, the subrange being configured by a plurality of logical pages, sets one of the logical pages including the logical record to be moved as a source logical page of the logical record to be moved, sequentially detects space areas from the leading position of the subrange, sets one of the logical pages including a space area in which the logical record to be moved stored as a destination logical page of a logical record, performs exclusive control only on the destination logical page and the source logical page, and moves the logical record to be moved from the source logical page to the space area of the destination logical record,
    wherein a rearrangement is executed such that scattered space areas are collected by sequentially moving a logical record in the source logical page to the space area in the destination logical page progressing backward from the space area in one of the logical pages of the leading position of the subrange; and
    the logical record to be moved is sequentially detected toward the leading position from one of the logical pages immediately before a trailing logical page of the subrange.

2. The database apparatus according to claim 1, wherein on determining the trailing logical page is moved by adding a new logical record, the logical record is moved by setting a target as a logical page to be moved at places from the destination logical page of a current logical record to the logical page immediately before the trailing logical page after adding the new logical record on determining an arrangement of logical records is executed sequentially toward a leading logical page from the logical pages at a place immediately before the trailing logical page before the addition.

3. The database apparatus according to claim 1, wherein the logical record included in the trailing logical page is moved on determining the rearrangement of logical records is executed sequentially toward a leading logical page from the logical page at a place immediately before a trailing page in the subrange.

4. The database apparatus according to claim 3, wherein the rearrangement of logical records executed sequentially at any of places from the leading logical page to the logical page immediately before the trailing logical page in the subrange is terminated on determining the destination logical page number matches the source logical page number.

5. The database apparatus according to claim 3, wherein on determining the movement of the logical record included in the trailing logical page is terminated, the destination logical page of the logical record included in the trailing logical page is set as a rearranged trailing page in the subrange.

6. The database apparatus according to claim 1, wherein the logical record has a configuration in which an owner record and lower member records are connected through pointers.

7. The database apparatus according to claim 1, wherein on determining the logical record is moved, a key value of the logical record and an index in which a storage location of the logical record is registered are simultaneously updated.

8. A method for rearranging a logical record in a database apparatus in a sequentially accessing method of sequentially storing the logical record from a leading position of a subrange, the method comprising:
    detecting the logical record to be moved from a rear portion of the subrange, the subrange configured by a plurality of logical pages, by a processor, and setting one of the logical page including the logical record to be moved as a source logical page of the logical record to be moved by the processor;
    sequentially detecting space areas from a-the leading position of the subrange, and setting one of the logical pages including the space area in which the logical record to be moved stored as a destination logical page of a logical record by the processor; and
    performing exclusive control only on the destination logical page and the source logical page, and moving the logical record to be moved from the source logical page to the space area of the destination logical page by the processor,
    wherein a rearrangement is executed such that scattered space areas are collected by sequentially moving a logical record in the source logical page to the space area in the destination logical page progressing backward from the space area in one of the logical pages of a leading position of the subrange: and
    the logical record to be moved is sequentially detected toward the leading position from one of the logical pages immediately before a trailing logical page of the subrange.

9. A computer-readable, non-transitory medium storing a program for rearranging a logical record in a database apparatus in a sequentially accessing method of sequentially storing the logical record from a leading position of a subrange, the program causing a computer to execute a procedure, the procedure comprising:
    detecting the logical record to be moved from a rear portion of the subrange, the subrange configured by a plurality of logical pages, and setting one of the logical pages including the logical record to be moved as a source logical page of the logical pages record to be moved;
    sequentially detecting space areas from the leading position of the subrange, and setting one of the logical pages including the space area in which the logical record to be moved stored as a destination logical page of a logical record; and
    performing exclusive control only on the destination logical page and the source logical page, and moving the logical record to be moved from the source logical page to the space area of the destination logical page,
    wherein a rearrangement is executed such that scattered space areas are collected by sequentially moving a logical record in the source logical page to the space area in the destination logical page progressing backward from the space area in the logical pages of the leading position of the subrange, and
    wherein the logical record to be moved is sequentially detected toward the leading position from one of the logical pages immediately before a trailing logical page of the subrange.

* * * * *

UNITED STATES PATENT AND TRADEMARK OFFICE
CERTIFICATE OF CORRECTION

PATENT NO. : 8,682,941 B2
APPLICATION NO. : 13/072007
DATED : March 25, 2014
INVENTOR(S) : Enbutsu Page 1 of 1

It is certified that error appears in the above-identified patent and that said Letters Patent is hereby corrected as shown below:

In the Claims

Column 11, Line 33, In Claim 8, delete "a-the" and insert -- the --, therefor.
Column 12, Line 6, In Claim 8, delete "subrange:" and insert -- subrange; --, therefor.
Column 12, Line 21, In Claim 9, delete "logical pages record" and insert -- logical record --, therefor.

Signed and Sealed this
Twenty-fourth Day of June, 2014

Michelle K. Lee
*Deputy Director of the United States Patent and Trademark Office*